Figure 1:
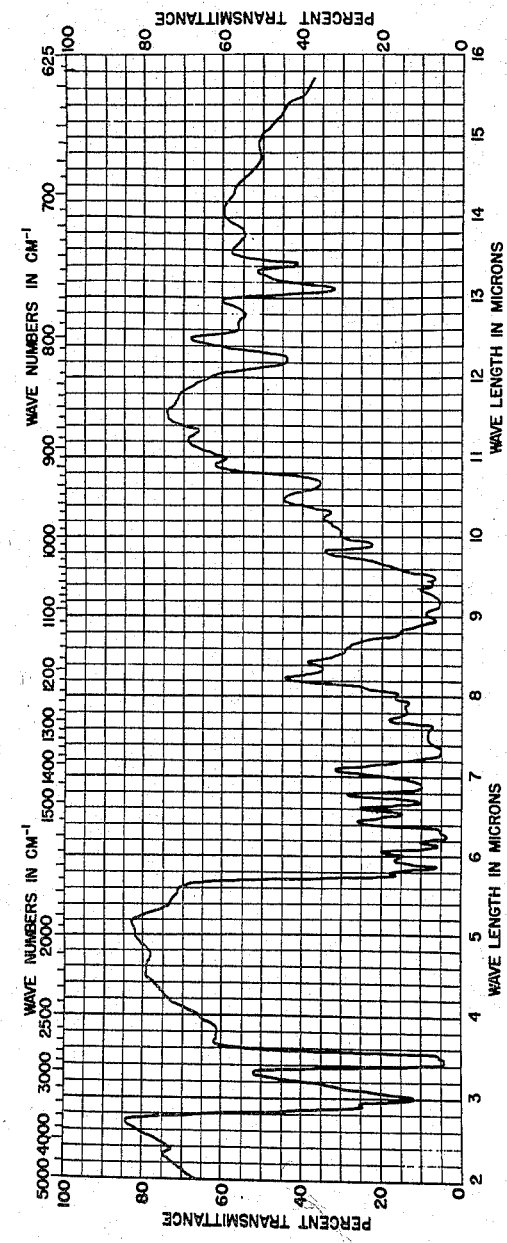

FIGURE I
INFRARED ABSORPTION SPECTRUM OF DIHYDROSTREPTONIVICIN

HERMAN HOEKSEMA
INVENTOR.
By
ATTORNEYS

INFRARED ABSORPTION SPECTRUM OF DISODIUM SALT OF DIHYDROSTREPTONIVICIN

3,175,944
DIHYDRONOVOBIOCIN AND DERIVATIVES THEREOF

Herman Hoeksema, Kalamazoo Township, Kalamazoo County, Mich., assignor to The Upjohn Company, Kalamazoo, Mich., a corporation of Michigan
Filed June 18, 1956, Ser. No. 592,212
11 Claims. (Cl. 167—65)

This invention relates to novel compositions of matter and to a process for the preparation thereof and is particularly directed to dihydronovobiocin and its salts and to pharmaceutical preparations containing the same.

This application is a continuation-in-part of my copending application Serial No. 545,307, filed November 7, 1955, and applications of Dietz, De Boer, Smith, Bergy, and myself, Serial No. 516,742, filed June 20, 1955, and Serial No. 557,965, filed January 9, 1956, and all now abandoned.

Novobiocin, also known as Antibiotic 66a, streptonivicin, and as Albamycin (registered trademark), is an antibiotic substance obtained as an elaboration product of *Streptomyces niveus*, as more fully set forth in copending U.S. applications of Dietz, De Boer, Smith, Bergy, and Hoeksema, supra. Novobiocin is characterized by an optical rotation $$[\alpha]_{23-26°}^{D} = \text{minus } 63.0 \text{ degrees}$$

(c., 1 percent absolute ethanol, 2 decimeters) and by the following formula:

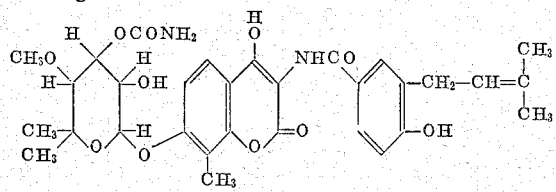

It exists in two crystal forms, Form 1 melting with decomposition between 174 and 178 degrees centigrade and Form 2 melting with decomposition between 149 and 151 degrees centigrade. It has the following antimicrobial spectrum:

TABLE I
*Antimicrobial spectrum*

| Test Organism | Minimal Inhibitory Concentration (mcgs./ml.) | | |
|---|---|---|---|
| | Agar Dilution [1] | Broth Dilution [1] | |
| | | I | II |
| Staphylococcus aureus | | 0.04–0.1 | 0.1 |
| Staphylococcus albus | 1 | | 0.2 |
| Streptococcus hemolyticus | | 0.5 | 3.1 |
| Streptococcus fecalis | 10 | | 1.5 |
| Streptococcus viridans | | | 0.8 |
| Salmonella typhosa | 10 | | 12.5 |
| Salmonella pullorum | | | 50 |
| Salmonella schottmuelleri | 1,000 | | |
| Klebsiella pneumoniae | | 12.5 | 6.2 |
| Diplococcus pneumoniae | | 0.5 | 1.5 |
| Pasteurella multocida | | 1.0 | 1.5 |
| Leuconostoc mesenteroides | | 2.5 | 2.5 |
| Leuconostoc citrovorum | | 25 | 25 |
| Clostridium novyi | | 25 | 25 |
| Shigella dispar | 1,000 | | |
| Bacillus subtilis | 10 | | 1.5 |
| Saccharomyces cerevisiae | 1,000 | | |
| Serratia marcescens | 100 | | 25 |
| Escherichia coli | 1,000 | | 50 |
| Aerobacter aerogenes | 1,000 | | 12.5 |
| Pseudomonas aeruginosa | 1,000 | | 12.5 |
| Proteus vulgaris | 1,000 | | 3.1–25 |
| Proteus rettgeri | | | 6.2–400 |
| Agrobacterium tumefaciens | 100 | | 1.5 |
| Xanthomonas campestris | 100 | | 1.5 |
| Xanthomonas pruni | | | 3 |
| Erwinia amylovora | | | 100 |
| Corynebacterium faciens | | | 1.5 |
| Mycobacterium tuberculosis H37RV | | | 2.5 |

[1] The agar dilution assays represent preliminary assays made at tenfold dilutions whereas the broth dilution assays represent more extensive and complete assays made at twofold dilutions.

Novobiocin has the advantages of being highly active against resistant Staphylococci, that is, of not being cross-resistant with the antibiotics in general therapeutic usage, of being nontoxic, of minimizing secondary infections, of rapid absorption in all forms of administration whether orally or parenterally, and of unusually high blood levels by all routes of administration.

Novobiocin, however, has a disadvantage in that it does not lend itself readily to the preparation of stable preparations in aqueous vehicles. The water-soluble salts of novobiocin are not sufficiently stable in water for packaged formulations involving aqueous vehicles. Novobiocin in crystalline Form 2 is not readily absorbed and is not therefore well suited for use in aqueous vehicles. Novobiocin in crystalline Form 1, while being readily absorbed and therefore suitable for use in aqueous vehicles, has been difficult to prepare in good yields since crystalline Form 2, the more stable form, became available. These disadvantages indicate the desirability of a derivative of novobiocin which is both readily absorbed and stable in aqueous preparations.

It has now been found that the advantages of novobiocin are retained and the disadvantages avoided in dihydronovobiocin. It has been found that on hydrogenation of novobiocin with a hydrogenation catalyst effective to saturate ethenoid unsaturation, the novobiocin is converted to dihydronovobiocin which fortuitously possesses all the advantages of novobiocin in regard to lack of toxicity, broad antimicrobial spectrum, unusually high blood levels from both parenteral and oral administration, lack of cross-resistance and freedom from the debilitating secondary infections which frequently accompany the administration of the known antibiotics, and, at the same time, is stable in aqueous vehicles and readily absorbed therefrom.

Dihydronovobiocin is prepared by hydrogenating novobiocin with Raney nickel or platinum oxide (Adams' catalyst) or like hydrogenation catalyst for saturating an ethenoid double bond. The hydrogenation is carried out in the presence of a solvent for novobiocin such as the lower aliphatic alcohols, for example, methanol, ethanol, and like lower alkanols and β-methoxyethanol, β-ethoxyethanol, β-butoxyethanol, and like lower alkoxyethanols (Cellosolves), and the like. The temperature can range from zero to 100 degrees centigrade or so and the pressure from zero to 1000 pounds per square inch gauge or so. The reaction can be considered complete when one mole of hydrogen is absorbed for each mole of novobiocin and usually requires five to about thirty minutes. Longer periods up to 24 hours or so, however, can be used.

On completion of the reaction the catalyst is removed, the filtrate diluted with water and acidified, suitably with hydrochloric acid, to convert any salts which may be present as a result of the basicity of the catalyst to the free acid. Ordinarily the reaction mixture will be at a pH of about 4 to 5 and it will be sufficient to acidify it to a pH of around 1 to 2. The catalyst may be filtered off and the resulting filtrate diluted with several volumes of water, say from three to five volumes for each volume of filtrate. On the addition of the acid, a white precipitate is formed. On filtering and drying at low pressure, say in the order of 25 microns of mercury and at room temperature, dihydronovobiocin is obtained in yields of ninety percent or better. The material thus obtained is amorphous. On recrystallization from chloroform or like chlorinated hydrocarbon solvent, it is obtained in beautiful white crystals having a melting point of 163–5 degrees centigrade. The same product is obtained whether novobiocin Form 1 or Form 2 crystals are used as the starting product or whether a crude novobiocin is hydrogenated and then purified.

The product is distinguished from novobiocin by having a slightly different ultraviolet absorption in acid ethanol with a peak at 328 millimicrons as against a peak at 334 millimicrons for novobiocin; by the melting point characteristic of its crystals; by the ready absorption of its crystals as compared with the very poor absorption of Form 1 crystals of novobiocin; by increased solubility in chloroform (0.5 percent weight by volume at 25 degrees centigrade) and amyl acetate, and by its characteristic infrared absorption spectrum, as shown in Table II. The product has been shown to have the following structure:

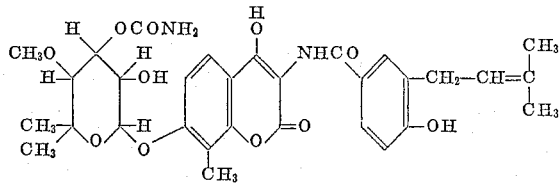

7 - [4 - (carbamoyloxy)tetrahydro - 3 - hydroxy - 5 - methoxy - 6,6 - dimethylpyran - 2 - yloxy] - 4 - hydroxy - 3 - [4 - hydroxy - 3 - (3 - methylbutyl) benzamido] - 8 - methylcoumarin

TABLE II

*Infrared absorption in reciprocal centimeters (mineral oil mull)*

| Dihydro-novobiocin [1] | Novobiocin | |
|---|---|---|
| | Form 1 | Form 2 |
| 3,450 | 3,500 | 3,480 |
| 3,350 | 3,445 | 3,360 |
| 3,200 | 3,395 | 3,280 |
| 2,620 | | |
| 1,736 | 1,744 | |
| 1,706 | 1,738 | 1,715 |
| 1,667 | 1,694 | 1,690 |
| 1,633 | 1,642 | 1,635 |
| 1,602 | 1,607 | 1,610 |
| 1,580 | | 1,586 |
| 1,535 | 1,542 | 1,534 |
| 1,502 | 1,500 | 1,507 |
| 1,372 | 1,374 | 1,374 |
| | 1,360 | 1,344 |
| 1,317 | 1,320 | 1,315 |
| 1,285 | 1,294 | 1,293 |
| 1,270 | 1,280 | |
| 1,251 | 1,252 | 1,259 |
| | 1,235 | |
| | 1,219 | |
| 1,205 | | |
| 1,172 | | 1,186 |
| | 1,162 | 1,157 |
| 1,140 | 1,138 | |
| 1,117 | 1,124 | 1,121 |
| | 1,103 | |
| 1,090 | 1,091 | |
| | 1,080 | 1,084 |
| 1,060 | 1,062 | 1,064 |
| | 1,029 | 1,022 |
| 1,009 | 1,000 | 998 |
| 970 | 969 | 972 |
| 937 | 930 | 934 |
| 911 | 904 | 919 |
| 879 | 881 | |
| | 846 | 837 |
| 814 | | 818 |
| | 800 | 809 |
| 790 | 789 | 789 |
| 780 | 770 | 781 |
| 762 | 755 | 761 |
| | | 753 |
| 743 | 739 | 741 |
| 720 | 716 | |

[1] Recrystallized from chloroform.

In other respects, for example, optical rotation, solubility in water at different pH values, solubility in organic solvents, ultraviolet absorption in basic solution in aqueous ethanol, and antimicrobial spectrum and end points, its properties do not differ essentially from those of novobiocin.

On quantitative hydrogenation, novobiocin takes up about 3.6 milligrams of hydrogen for each gram of novobiocin. Since novobiocin has been shown by X-ray and optical crystallographic measurements on Form 2 crystals to have a molecular weight of 618.41±2 percent, it is indicated that approximately 1.1 moles of hydrogen is taken up for each mole of novobiocin. The molecular weight of dihydronovobiocin, therefore, is between about 608 and 632. Its empirical formula as determined by elemental analysis of novobiocin and the molecular weight is $C_{31}H_{38}O_{11}N_2$. A molecular weight of 620 corresponds with the formula $C_{31}H_{44}O_{11}N_2$; 616 with $C_{31}H_{40}O_{11}N_2$.

Dihydronovobiocin and novobiocin have the same antimicrobial spectra and the same end points determined by the broth dilution assay. The close agreement of the end points against some of the more common pathogenic bacteria is shown in the following table:

TABLE III

*Antimicrobial spectrum*

| | Minimal Inhibitory Concentration (mcgs./ml.) | |
|---|---|---|
| Test Organism | Dihydro-novobiocin | Novobiocin |
| Staphylococcuc aureus | 0.6 | 0.1 |
| Streptococcus hemolyticus | 2 | 3.1 |
| Diplococcus pneumoniae | 0.6 | 1.5 |
| Salmonella typhosa | 10 | 12.5 |
| Klebsiella pneumoniae | 10 | 6.2 |
| Pasteurella multocida | 3 | 1.5 |

Like novobiocin, dihydronovobiocin forms acid and neutral salts. Thus by neutralization of dihydronovobiocin with the appropriate base, alkali metal and alkaline earth metal salts, magnesium salts, and like metal salts are obtained. By treating a solution or suspension of the antibiotic with one or two equivalents of an appropriate base, such as sodium hydroxide, potassium hydroxide, calcium hydroxide, and the like, or the corresponding alkoxides such as the methoxides (in anhydrous medium), the acid and neutral salts are obtained. With one equivalent of the base, there are obtained the monosodium, monopotassium, hemicalcium, and like salts of dihydronovobiocin. Similarly with two equivalents of the base, the corresponding neutral sodium, potassium, calcium, or the like salts of dihydronovobiocin are obtained. The acid salts can also be formed by double decomposition with salts of a weaker acid such as sodium acetate. They can also be formed by a double decomposition based upon differential solubility; for example, sodium dihydronovobiocin reacts in aqueous or ethanolic solution with soluble calcium salts to form the insoluble hemicalcium dihydronovobiocin.

Ammonium salts of dihydronovobiocin are obtained in like manner by substituting a nitrogenous base, such as ammonia or a suitable amine, for the inorganic base. Advantageously the neutralization is effected in an organic solvent such as methanol, ethanol, propanol, butanol, amyl acetate, and the like. Quaternary ammonium hydroxides, such as tetramethylammonium hydroxide, can be used to give the corresponding quaternary ammonium salts. Thus by treating dihydronovobiocin with ammonia, mono-, di-, and trimethylamines, mono-, di-, and triethylamines, mono-, di-, and tripropylamines (iso and normal), ethyldimethylamine, benzyldiethylamine, cyclohexylamine, benzylamine, dibenzylamine, N,N-dibenzylethylenediamine, bis-(ortho-methoxyphenylisopropyl)amine, and like lower-aliphatic, lower-cycloaliphatic, and lower-araliphatic amines up to and including about eight carbon atoms; heterocyclic amines suh as piperidine, morpholine, pyrrolidine, piperazine, and the lower-alkyl derivatives thereof, such as, 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, and the like; amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris-(hydroxymethyl)-aminomethane, phenylmonoethanolamine, p-tertiaryamylphenyldiethanolamine, and galactamine, N-methylglucamine, N-methyl glucosamine, ephedrine, phenylephedrine, epinephrine, procaine, and the like; tetraethylammonium hydroxide, and like quaternary ammonium hydroxides; guanidine and the like, there are obtained the corresponding acid ammonium salts. In a like manner the ammonium salts of more complex amines, such as the neomycins, including neamine, neomycin B, and neomycin C, and the erythromycins, including erythromycin and erythromycin B, can be used. Ordinarily only acid ammonium salts are obtained.

Dihydronovobiocin also reacts with diazoalkanes to give the corresponding alkylated products. For example, on treatment with diazomethane according to the standard method for esterification with diazoalkanes, methylated dihydronovobiocin is obtained. Furthermore, on reacting dihydronovobiocin with an organic acid anhydride or acid halide, the corresponding acylates are obtained. Thus by reacting dihydronovobiocin with a cold pyridine solution of acetic anhydride, the corresponding acetylated dihydronovobiocin is obtained.

Dihydronovobiocin and its derivatives are useful for the same purposes as novobiocin and the corresponding derivatives, as more particularly set forth in the abovementioned copending applications. Thus dihydronovobiocin and its derivatives are useful in the sugar industry to control slime caused by *Lactobacillus mesenteroides,* for the treatment of crowngall in root plants caused by *Agrobacter tumefaciens,* and wilting disease of corn caused by *Xanthomonas campestris.* It is also useful in the treatment of diseases caused by bacterial infections in man and animals and is particularly advantageous in this respect that it is active against resistant Staphylococcus organisms as well as against such resistant infections as are caused by Proteus organisms. Because of its high activity against these and a wide variety of microorganisms pathogenic in man and animals, and because of the fact that it gives the same high blood levels as novobiocin whether administered orally or parenterally, it is effective for the treatment of a wide variety of diseases, many of which do not respond readily to the antibacterial agents now available.

When administered, for example, parenterally, the antibiotic is also useful in the treatment of an infection in animals caused by *Pasteurella multocida,* the causative microorganism of hemorrhagic septicemia, a shipping fever infection of high incidence in cattle shipped to stockyards. Because of its activity against *Nocardia asteroides,* the causative organism of actinomycosis in animals and man, the use of dihydronovobiocin and derivatives thereof against this infection is likewise indicated. The antibiotic material can also be used as a feed supplement in promoting the growth of animals and poultry either alone or in combination with other antibiotics.

For these purposes novobiocin and its derivatives can be formulated in many different ways to form therapeutically effective compositions. Thus dihydronovobiocin and its derivatives can be dispersed in a pharmaceutically acceptable carrier which can be either a solid material (powdered or not) or a liquid (solvent or nonsolvent) to form compositions suitable for both parenteral and oral administration. These compositions can take the form of tablets, effervescent tablets, powders, granules, capsules (both hard and soft shell capsules), suspensions in edible oils, aqueous suspensions, or other dosage forms which are particularly useful for oral administration. They also can be in the form of sterile solutions or suspensions for parenteral administration, that is, by injection. In such compositions the sterile vehicle can be a sterile solvent or a sterile suspending liquid comprising an injectable oil or water containing hydrophilic colloids, such as sodium carboxymethylcellulose, methylcellulose, polyvinyl pyrolidone, gelatin, tragacanth, and the like. Dihydronovobiocin is particularly advantageous in such aqueous formulations because of its high stability in the presence of water and its ready absorbability, as more particularly set forth above.

The compositions can take the form of active material, namely, the antibiotic material, admixed with solid diluents and/or tabletting adjuvants such as corn starch, lactose, talc, stearic acid, magnesium stearate, gums, and the like. Any of the encapsulating or tabletting materials used in pharmaceutical practice can be employed where there is no incompatibility with the antibiotic. The materials can be tabletted with or without adjuvants. Alternatively, the antibiotic can be placed in the usual capsule or resorbable material such as the usual gelatin capsule and administered in that form. In yet another embodiment, the antibiotic can be put up in powder packets and so employed. Dihydronovobiocin, including metal salts and derivatives thereof, can be prepared in the form of a palatable suspension in a suitable fixed oil containing about two percent aluminum monostearate as a suspending agent. Such a suspension can be given orally as made or can be encapsulated. The antibiotic in the form of ointments including petrolatum-type grease base, creams, water-in-oil emulsions and lotions are useful topically; useful topical therapy is made of nosedrops, sprays, troches, and suppositories. For veterinary use, the preparation is essentially useful in the form of bougies, mastitis ointments, oil suspensions, and the like. The antibiotic of the invention is particularly useful when given by the oral or intramuscular routes; a useful dosage in humans is about fifty to about 1000 milligrams per dose and, in pediatric preparation, as low as about 25 milligrams per dose. Doses are given about one to six times per day, depending upon the patient's age and condition, the infection, the route of administration, and the like.

The percentage of active ingredient in these compositions can be varied. It is necessary that the active ingredient constitute a proportion so that a suitable dosage will be obtained. Obviously, several unit dosage forms can be administered at about the same time. Although it is found, particularly on intravenous injection, that a percentage of less than about 0.10 percent of antibiotic is effective, it is preferable to use not less than about 0.10 percent thereof. The effectiveness of the antibiotic increases with the amount of the antibiotic administered. Tablets containing from about fifty to about 1000 milligrams of dihydronovobiocin or its derivatives are useful. The solid pharmaceutical carrier can be in the form of a gelatin capsule.

Because of its marked antibacterial activity and low toxicity, dihydronovobiocin and its derivatives are useful as a therapeutic agent in the treatment of various diseases. Thus, either alone or in combination with sulfa compounds such as sulfadiazine, sulfamerazine, sulfamethazine (in a ratio of about one part of the antibiotic to two parts of total sulfa), and the like or antibiotics such as chloramphenicol, penicillin, tetracycline, oxytetracycline, chlortetracycline, fumagillin, neomycin (B or C), streptomycin, bacitracin, polymyxin, circulin, erythromycin, neamine, endomycin, filipin, celesticetin, streptolydigin, or the like, the antibiotic is useful in the treatment of staphylococcal, streptococcal, and pneumococcal pulmonary and respiratory infections. The mode of administration can be via the topical, oral or parenteral route. The antibiotic is likewise useful in combination with various vitamins such as thiamine, riboflavin, ascorbic acid, niacinamide, pyridoxine, pantothenic acid, or pantothenate salts, vitamin $B_{12}$, folic acid, and the like. Other therapeutically useful materials can also be combined with the antibiotic. Dihydronovobiocin and its derivatives are also useful in the treatment of pyodermas, pharyngitis, peritonitis, otitis, rhinitis, and the like, and in combination with corticoids, their therapeutic activity is enhanced in the treatment of atopic and contact dermatitis, neuro-dermatitis, pruritis, and the like. Suitable corticoids include cortisone, hydrocortisone, and esters thereof; $\Delta^1$-cortisone and $\Delta^1$-hydrocortisone including esters of these compounds in the 21-position, i.e., acetate, cyclopentylpropionate, and the like; 2-methyl hydrocortisone including esters thereof, and the like.

The invention now may be more fully understood by reference to the following examples which are given by way of illustration and are not to be construed as limiting.

EXAMPLE 1.—PREPARATION OF DIHYDRONOVOBIOCIN

To a solution of forty grams of crystalline novobiocin (prepared according to Example 4 of my copending application, Serial No. 516,742, supra) in 400 milliliters of warm absolute ethanol, there was added ten grams of Adams' catalyst (Organic Synthesis, Collective Volume No. 1, Second Edition, page 463, John Wiley and Sons, New York, 1932) and the mixture was hydrogenated at 25–40 degrees centigrade for one hour at a hydrogen pressure of forty pounds per square inch gauge. Considerable heat was evolved and the hydrogenation was complete in about fifteen minutes. The mixture was filtered through diatomaceous earth and the filtrate diluted with 1400 milliliters of water with vigorous stirring. To the resulting emulsion was added twenty milliliters of one-tenth normal hydrochloric acid causing a white precipitate to form. This was filtered and dried at low pressure (25 microns mercury) in a desiccator at room temperature. There was obtained 36 grams (90 percent yield) of dihydronovobiocin as a white amorphous powder. It had a potency against *K. pneumoniae* equal to that of the starting material.

The amorphous product thus obtained was dissolved in hot chloroform to a one percent solution, cooled to four degrees centigrade whereupon dihydronovobiocin crystallized out. After removal of the mother liquor and drying, crystalline dihydronovobiocin, having a melting point of 163–165 degrees centigrade and being otherwise characterized as given above, was obtained. The infrared spectrum of this material in a mineral oil (Nujol) mull is given in FIGURE 1 of the drawings.

Analytical data:
  Calculated for $C_{31}H_{44}O_{11}N_2$—C, 59.98; H, 7.15; N, 4.41.
  Calculated for $C_{31}H_{40}O_{11}N_2$—C, 60.38; H, 6.54; N, 4.54.
  Found—
    C, 60.31; H, 6.21; N, 4.58.
    C, 60.37; H, 6.26; N, 4.46.

Crystalline dihydronovobiocin is also obtained in triturating five grams of amorphous dihydronovobiocin in 100 milliliters of chloroform at 25 degrees centigrade. In about one to twenty hours all of the amorphous material is converted into crystalline dihydronovobiocin.

EXAMPLE 2.—PREPARATION OF DIHYDRONOVOBIOCIN

To a solution of ten grams of novobiocin in 120 milliliters absolute ethanol was added ten grams Raney nickel catalyst. The material was hydrogenated 24 hours under forty pounds per square inch gauge hydrogen in a Parr hydrogenator. The catalyst was removed and the solvent evaporated to thirty milliliters. Then fifty milliliters of acetone and 200 milliliters of technical hexane (Skellysolve B) were added to produce an oil. This was separated and dried in vacuo. The amorphous solid was dissolved in chloroform and the solution washed with one-half volume 0.1 normal hydrochloric acid. The chloroform was then evaporated to one-half volume and cooled to precipitate 4.5 grams of crystalline dihydronovobiocin which was of equal activity to the starting material.

EXAMPLE 3.—PREPARATION OF SODIUM ACID DIHYDRONOVOBIOCIN

Figure 2:
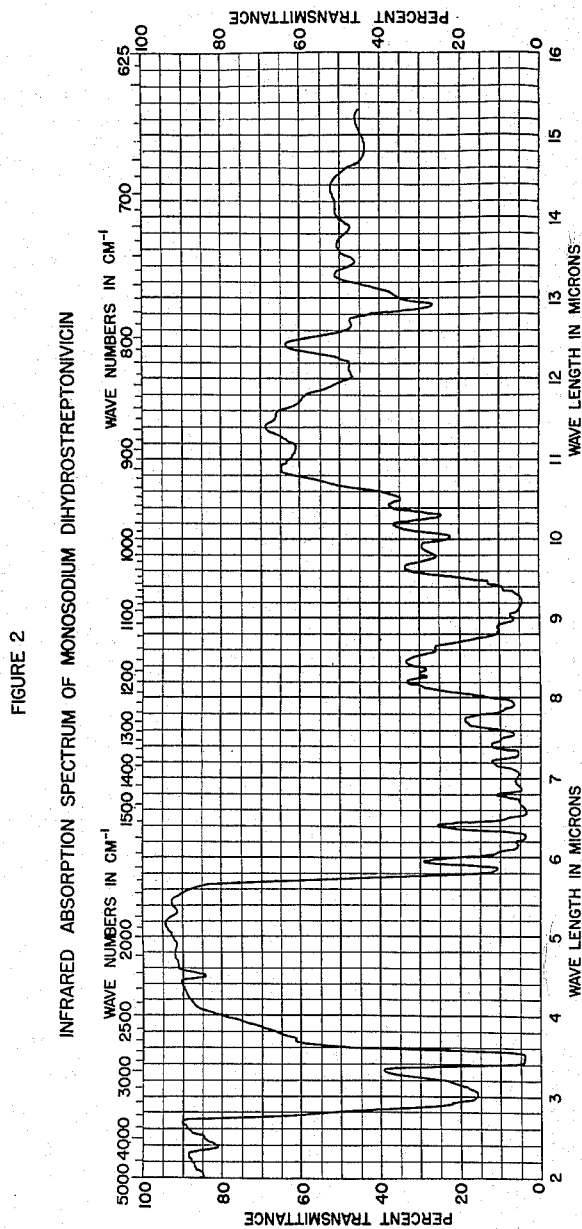

A solution of four grams (6.45 millimoles) of crystalline dihydronovobiocin in ninety milliliters of acetone was dried for thirty minutes over anhydrous magnesium sulfate. To this dry solution there was added 350 milligrams (6.4 millimoles) of sodium methoxide and the mixture was stirred for 24 hours at 25 degrees centigrade. The sodium methoxide gradually dissolved and the sodium acid hydronovobiocin crystallized simultaneously. The precipitated crystals were separated, washed thoroughly with ninety milliliters of dry acetone, and dried at 25 degrees centigrade in vacuo. There was obtained 3.5 grams (81 percent of theory) of sodium acid dihydronovobiocin, melting point 225–235 degrees centigrade with decomposition, having a potency against *K. pneumoniae* equal to that of the starting material and of pure novobiocin. The infrared spectrum of this material in a mineral oil (Nujol) mull is given in FIGURE 2 of the drawings.

EXAMPLE 4.—PREPARATION OF DISODIUM DIHYDRONOVOBIOCIN

Figure 3:
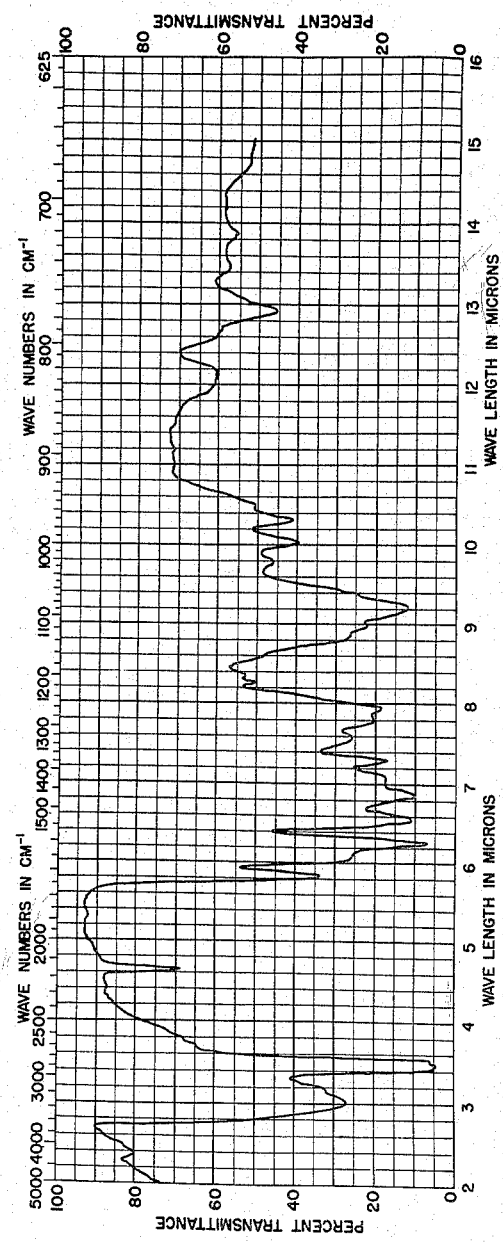

A four-gram (6.45 millimoles) quantity of crystalline dihydronovobiocin was suspended in twenty milliliters of water and 12.9 milliliters (12.9 millimoles) of one normal sodium hydroxide solution was gradually added. The resulting solution (pH 10.5) was filtered and dried by evaporation from the frozen state. There was obtained 4.25 grams (100 percent of theory) of disodium dihydronovobiocin. The product had a potency against K. *pneumoniae* equal to about eighty percent of that of the starting material and of pure novobiocin. The infrared spectrum of this material in a mineral oil (Nujol) mull is given in FIGURE 3 of the drawings.

EXAMPLE 5.—PREPARATION OF HEMICALCIUM SALT OF DIHYDRONOVOBIOCIN

To a solution of 62 grams (0.1 mole) of dihydronovobiocin dissolved in 250 milliliters of acetone, there was added four grams (0.1 mole) of sodium hydroxide in fifty milliliters of water. When a solution was obtained, it was filtered and 12.7 milliliters of four molar calcium chloride was added with warming and stirring to induce crystallization. Over the next three hours, 300 milliliters of water was added and the slurry was refrigerated overnight. It was then filtered and the white crystals dried. There was obtained 55 grams (85 percent of theory) of the hemicalcium salt of dihydronovobiocin.

EXAMPLE 6

To one gram of crystalline dihydronovobiocin dissolved in twenty milliliters of amyl acetate is added 0.162 gram (one equivalent) of di-n-propylamine. The resulting white amorphous precipitate, the di-n-propylamine salt of dihydronovobiocin is separated and dried.

Following the procedure described in Example 5, except for the replacement of di-n-propylamine by one equivalent of the appropriate amine, there are obtained the acid salts of dihydronovobiocin and the amines listed above.

Dihydronovobiocin in crystalline form as obtained in Example 1 has the following ultraviolet absorption characteristics:

In seventy percent ethanol containing 0.01 normal sulfuric acid:

| Millimicrons: | $E_1^{1\%}$ cm. |
|---|---|
| 328 (main peak) | 417 |
| 305 (inflection) | 302 |
| 278 | 208 |
| 260 | 202 |
| 248 (inflection) | 219 |
| 232 (inflection) | 312 |

In seventy percent ethanol containing 0.01 normal potassium hydroxide:

| Millimicrons: | $E_1^{1\%}$ cm. |
|---|---|
| 308 (main peak) | 547 |
| 288 (inflection) | 398 |
| 253 (inflection) | 192 |
| 232 (inflection) | 317 |

EXAMPLE 7

An aqueous suspension for oral use, containing in each five cc. dose 100 milligrams of dihydronovobiocin, is prepared from the following types and amounts of materials:

| | | |
|---|---|---|
| Dihydronovobiocin [1] | grams | 20 |
| Citric acid, U.S.P. | do | 2 |
| Benzoic acid, U.S.P. | do | 1 |
| Methylparaben, U.S.P. | do | 1 |
| Propylparaben, U.S.P. | do | 0.5 |
| Glycerin, U.S.P. | cc | 150 |
| Tragacanth powder, U.S.P. | grams | 7.5 |
| Essential oil flavor concentrate | cc | 0.2 |
| Sucrose, U.S.P. | grams | 400 |
| Deionized water to make 1000 cc. | | |

[1] The dihydronovobiocin used in the examples, unless otherwise noted, is in the amorphous form obtained by the procedure of Example 1.

The citric acid is dissolved in 500 cc. of water. The benzoic acid and parabens are dispersed in the glycerin in a separate container, followed by the finely powdered dihydronovobiocin, tragacanth and flavors in the order named. This is mixed well until a uniform suspension is obtained and the suspension then added to the aqueous citric acid solution with rapid stirring. Finally, the sugar is added and the whole mixed thoroughly followed by processing through a colloid mill. Sufficient water is used to rinse the colloid mill and the rinsings used to bring the final volume to 1000 cc. The suspension is assayed for potency and used clinically.

EXAMPLE 8

An aqueous suspension for oral use, containing in each one cc. dose 100 milligrams of dihydronovobiocin, is prepared by the procedure of Example 1 from the following types and amounts of materials:

| | | |
|---|---|---|
| Dihydronovobiocin | grams | 100 |
| Polyethylene Glycol 4000, U.S.P. | do | 60 |
| Sodium carboxymethylcellulose, Low viscosity | do | 5 |
| Benzoic acid, U.S.P. | do | 1 |
| Methylparaben, U.S.P. | do | 1 |
| Citric acid, U.S.P. | do | 1 |
| Soluble saccharin | do | 1 |
| Sucrose, U.S.P. | do | 700 |
| Essential oil flavor concentrate | cc | 0.1 |
| Deionized water to make 1000 cc. | | |

The suspension is assayed for potency and used clinically.

EXAMPLE 9

A sterile aqueous suspension for intramuscular use, containing in one cc. 300 milligrams of dihydronovobiocin, is prepared from the following types and amounts of materials:

| | | |
|---|---|---|
| Dihydronovobiocin | grams | 300 |
| Sodium carboxymethylcellulose, low viscosity | do | 7.5 |
| Polyvinylpyrrolidone [1] | do | 7.5 |
| Polysorbate 80, U.S.P. | do | 4 |
| Methylparaben, U.S.P. | do | 2.5 |
| Propylparaben, U.S.P. | do | 0.17 |
| Water for injection, U.S.P. | cc | 1000 |

[1] Polyvinylpyrrolidone is sold by The General Aniline and Film Co. under the trademark "Plasdone" and is characterized by a viscosity coefficient, i.e., K value, of 26 to 36 and a molecular weight of about 40,000.

The sodium carboxymethylcellulose, polyvinylpyrrolidone and polysorbate 80 are dispersed in sufficient water and sterilized by autoclaving at 120 degrees centigrade for thirty minutes. The finely powdered dihydronovobiocin, methylparaben, and propylparaben are sterilized separately by treatment with ethylene oxide, then mixed well in a suitable sterile blender and finally dispersed in the cooled, autoclave vehicle. The finished sterile suspension is packaged aseptically in small sterile vials, assayed for potency, and used clinically.

EXAMPLE 10

An aqueous suspension for oral use, containing in each five cc. dose, one-half gram of total sulfas, and 250 milligrams of dihydronovobiocin, is prepared by the procedure of Example 1 from the following types and amounts of materials:

| | | |
|---|---|---|
| Dihydronovobiocin | grams | 50 |
| Sulfadiazine | do | 33.3 |
| Sulfamerazine | do | 33.3 |
| Sulfamethazine | do | 33.3 |
| Citric acid, U.S.P. | do | 2 |
| Benzoic acid, U.S.P. | do | 1 |
| Methylparaben, U.S.P. | do | 1 |
| Propylparaben, U.S.P. | do | 0.5 |
| Soluble saccharin | do | 1 |
| Sucrose, U.S.P. | do | 700 |
| Tragacanth powder, U.S.P. | do | 5 |
| Essential oil flavor concentrate | cc | 0.2 |
| Deionized water to make 1000 cc. | | |

The suspension is assayed for potency and used clinically.

EXAMPLE 11

A sterile, aqueous suspension for eye or ear use is prepared from the following types and amounts of materials:

| | Grams |
|---|---|
| Dihydronovobiocin, micronized | 10 |
| Neomycin sulfate | 6 |
| Hydrocortisone, micronized | 10 |
| Sodium citrate, U.S.P. | 4.5 |
| Polyethylene glycol 4000, U.S.P. | 120 |
| Quatresin (myristyl-γ-picolinium chloride) | 0.2 |
| Polyvinylpyrrolidone | 1 |
| Water for injection to make 1000 cc. | |

All the water-soluble materials are dissolved in the water for injection and the resulting solution is sterilized by filtration. The insoluble materials, dihydronovobiocin and hydrocortisone, are sterilized by treating with ethylene oxide and then dispersed in the sterile vehicle previously prepared. The final suspension is processed through a sterile colloid mill to assure even dispersion of the insoluble material. The sterile preparation is filled into sterile ophthalmic dropper bottles, assayed for potency and used clinically.

EXAMPLE 12.—PREPARATION OF DIHYDRONOVOBIOCIN

To a solution of ten grams of crystalline novobiocin (prepared according to Example 4 of my copending application, Serial No. 516,742, supra) in 100 milliliters of warm absolute ethanol, there was added one gram of ten percent palladium on charcoal and the mixture was hydrogenated at 25–40 degrees centigrade for one hour at a hydrogen pressure of forty pounds per square inch gauge. The hydrogenation was complete in about thirty minutes. The mixture was filtered through diatomaceous earth and the filtrate diluted with 300 milliliters of water with vigorous stirring. To the resulting emulsion was added six milliliters of one-tenth normal hydrochloric acid causing a white precipitate to form. This was filtered and dried at low pressure (25 microns mercury) in a desiccator at room temperature. There was obtained nine grams (ninety percent yield) of dihydronovobiocin as a white amorphous powder. It had a potency against *K. pneumoniae* equal to that of the starting material.

It is to be understood that the invention is not to be limited to the exact details of operation or exact compounds shown and described, as obvious modifications and equivalents will be apparent to one skilled in the

I claim:
1. Dihydronovobiocin.
2. Crystalline dihydronovobiocin characterized by a melting point of 163–165 degrees centigrade, by a specific rotation of about minus sixty degrees, by ultraviolet absorption in acid ethanol with a peak at 328 millimicrons, and by the characteristic infrared absorption spectrum shown in Table II.
3. A composition of matter comprising dihydronovobiocin and a pharmaceutical carrier.
4. A compound selected from the class consisting of dihydronovobiocin and the therapeutically useful salts thereof.
5. A compound selected from the class consisting of dihydronovobiocin according to claim 2 and the crystalline therapeutically useful salts thereof.
6. The monosodium salt of the compound of claim 1.
7. The disodium salt of the compound of claim 1.
8. The hemicalcium salt of the compound of claim 1.
9. A composition of matter comprising a compound according to claim 4 and a pharmaceutical carrier.
10. A composition of matter comprising crystalline dihydronovobiocin according to claim 2 dispersed in an aqueous dispersion medium.
11. A composition of matter comprising a compound according to claim 5 dispersed in an aqueous dispersion medium.

References Cited by the Examiner

UNITED STATES PATENTS 2,498,574  2/50  Peck _____ 260—210

OTHER REFERENCES

Hochstein et al.: J. Am. Chem. Soc. 76, October 1954, pp. 5080–2.

Berger et al.: J. Am. Chem. Soc. 73, November 1951, pp. 5295–7.

Flynn et al.: J. Am. Chem. Soc. 76, June 1954, page 3126.

J. Am. Chem. Soc. 77, December 20, 1955, pages 6710–1.

Welch et al.: Antibiotics and Chemotherapy, vol. 5 (December 1955), pp. 670–678.

Smith et al.: Antibiotics and Chemotherapy, vol. 6 (February 1956), pp. 135–142.

Hoeksema et al.: J. Am. Chem. Soc., vol 78 (May 1956), pp. 2019–20.

Wallick et al.: Antibiotics Annual, 1955–1956, pp. 909–914.

Abstracts of Papers No. 90 and 131–133 presented at the Antibiotic Symposium, November 2–4, 1955, in Washington, D.C.

LEWIS GOTTS, *Primary Examiner.*

ABRAHAM H. WINKELSTEIN, A. LOUIS MONACELL, *Examiners.*